United States Patent [19]

Johnson et al.

[11] Patent Number: 5,598,053
[45] Date of Patent: Jan. 28, 1997

[54] LCD-CRT HYBRID IMAGE TUBE

[75] Inventors: John L. Johnson, Huntsville, Ala.;
Kevin L. Landel, Cardiff, Calif.

[73] Assignee: The United States of America as represented by the Secretary of the Army, Washington, D.C.

[21] Appl. No.: 409,463

[22] Filed: Mar. 20, 1995

[51] Int. Cl.[6] ............................... H01J 29/10; G02F 1/13
[52] U.S. Cl. .......................... 313/364; 348/761; 348/791; 349/1; 349/58
[58] Field of Search ....................... 313/364, 441, 313/418, 408, 495; 359/36, 40, 83; 348/790, 761, 766, 791, 805; 345/87, 38

[56] References Cited

U.S. PATENT DOCUMENTS 5,229,872  7/1993  Mumola ............................ 359/40
5,381,252  1/1995  Chen ............................ 359/40 X
5,394,254  2/1995  Cheng ........................... 359/40 X Primary Examiner—Sandra L. O'Shea
Assistant Examiner—Ashok Patel
Attorney, Agent, or Firm—Hugh P. Nicholson; Freddie M. Bush; Hay Kyung Chang

[57] ABSTRACT

An LCD projection system, located within a standard color CRT, is used to project toward the screen decay stimulation patterns that vary dynamically from one frame to the next for each pixel based on the video signals received from external sources. This controls the output light intensity of the phosphors that are excited by a single electron gun. This system eliminates the three-electron-gun configuration of the standard CRT as well as the requirement of a shadow mask. What results is a CRT that is more rugged, easier to manufacture and that produces brighter and sharper images on its screen.

9 Claims, 1 Drawing Sheet

LCD-CRT HYBRID IMAGE TUBE

DEDICATORY CLAUSE

The invention described herein may be manufactured, used and licensed by or for the Government for governmental purposes without the payment to us of any royalties thereon.

BACKGROUND OF THE INVENTION

A typical cathode ray tube (CRT) scans a variable-strength electron beam over a phosphor (solid material which luminesce when suitably excited, such as silver-activated zinc sulfide and silver-activated zinc cadmium sulfide) screen, thereby producing a visible image through luminescence of the excited phosphor. In a color television, the luminance transmission is supplemented by the chrominance transmission which, in cooperation with a shadow mask, produces images in full color. The shadow mask is a perforated plate that contains about 200,000 precisely located holes and lies directly behind the phosphor screen. Each of the holes is accurately aligned with three different colored phosphor dots that make up a single pixel of the screen, the screen being composed of a multitude of such pixels evenly distributed throughout. When properly aligned, the shadow mask enables the visible images to have crisp pure colors and sharp well-defined edges. It accomplishes this by limiting the area that the electron beam can strike. The three electron guns inside the CRT generate a triplet of electron beams, each for a different color. Each beam must hit only the part of the pixel containing the phosphor that corresponds to its color. The shadow mask acts as a pinhole lens, using parallax due to the offset of the beams to allow the correct beam to hit the correct phosphor dot.

Monochrome CRT's have 640×480 pixels (NTSC standard) and HDTV (high definition television) contains 1125×768 while computer monitors have 1280×1024 pixels. As the number of pixels increases, the shadow mask's manufacturing requirements and alignment tolerances become extreme. If, due to material stresses, thermal expansion, assembly line quality control problems, mechanical shock or sundry other problems, the mask is misaligned by even one half of a pixel size, the overall image intensity and the picture sharpness and colorimetry can be significantly degraded over a substantial area of the screen. In order to have and maintain superior image quality, the shadow mask must be correctly located to within a small fraction of a single pixel and must remain positioned so for the life of the image tube.

Therefore, any technique or device which provides the same function as the shadow mask but with less stringent tolerance requirements and less sensitivity to misalignment will improve the image technology and yield a more rugged, durable image tubes without the high cost of extreme mechanical tolerance requirements. Also, the removal of the shadow mask will alleviate the requirement for exact focusing of the electron beam which is now necessary to obtain adequate screen brightness after losses due to the shadow mask.

SUMMARY OF THE INVENTION

The luminescent properties of phosphors are combined with optical modulation via a liquid crystal display (LCD) to make a device that controls, by decay stimulation, the output light intensity of the phosphors of a CRT imaging screen. In response to the video signals received from external sources, an LCD array projects toward the phosphor screen decay stimulation patterns that vary dynamically from one frame to the next for each pixel. Further, CRT pixel area definition is obtained by selective phosphor quenching rather than by using a shadow mask.

DESCRIPTION OF THE PREFERRED EMBODIMENT

Figure 1:
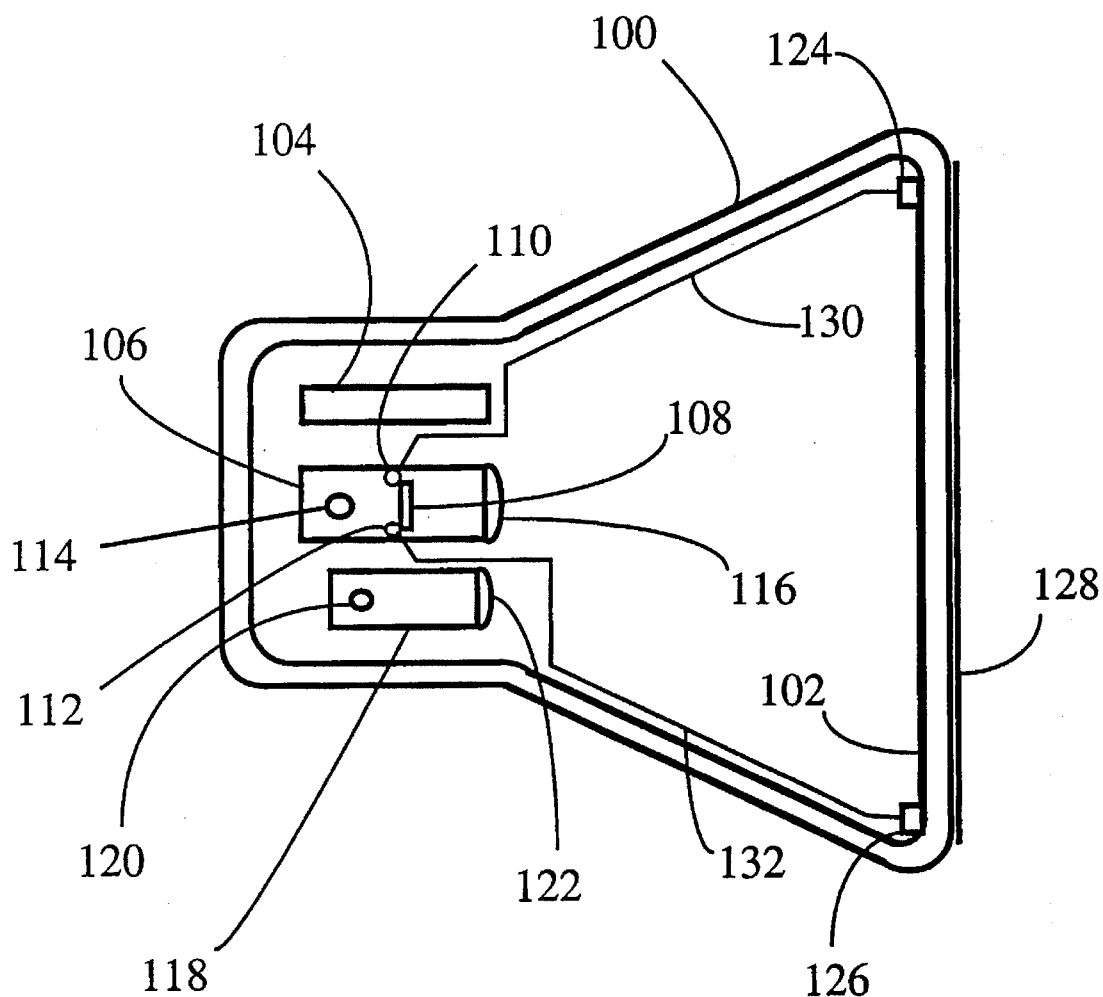
FIG. 1 is a diagram of the preferred embodiment of the invention.
Figure 2:
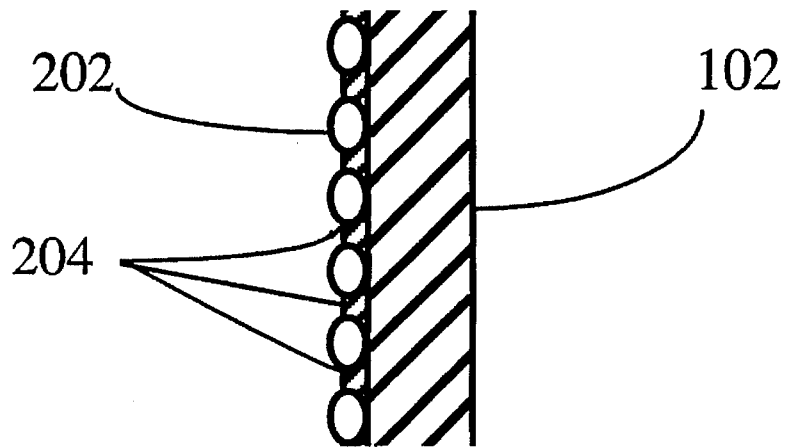
FIG. 2 shows the details of the interspersion of the non-pixel (quenching) areas among phosphor dots.

Luminescence occurs when a material such as phosphor receives excitation from an energy source and then emits it in a deexcitation mode characterized by an exponential or inverse time decay. The excitation can be caused by light (ex. ultraviolet, visible, infrared), by electrical power (ex. current, voltage, electron beam), thermal or mechanical (ex. friction). The decaying process can be stimulated, for example, by manipulating the phosphor's composition such that its decay rate is increased by the application of radiation of a particular frequency, usually in the spectral region toward the red or infrared. The phosphor composition can also be made so that the application of radiation of a given frequency causes the decay to shift to a non-radiative mode, the observable effect being the immediate and complete darkening of the phosphor. In this case, the phosphor is still decaying but via a non-radiative transition rather than through emission of visible light. These two phenomena are referred to as decay stimulation and quenching, respectively.

The brightness of the output light of the phosphor depends on how fast it is decaying as well as how strongly it is being excited. If the decay rate is dynamically varied from one frame to the next for each pixel, then the output brightness also varies accordingly even if the excitation input is constant. This principle is used to advantage to make a CRT whose pixel-to-pixel, frame-to-frame brightness is controlled not by varying the intensity of the electron beam but by varying the decay rate. The constant-intensity electron beam that is necessary to excite the phosphors is delivered by a single electron gun while the pixels are addressed by an internal LCD array.

The explanation of the operation of the LCD-CRT hybrid image tube is facilitated by references to the figures wherein like numbers refer to like parts.

In a standard cathode ray tube (CRT) 100, viewing screen 102 is made up of multiplicity of pixels each of which, in the case of a color monitor, is comprised of a triplet of phosphor dots 202, one for each of the colors red, green or blue. Toward this screen, electron gun 104 emits an electron beam of a given intensity, thereby exciting the phosphor dots and initiating the decaying process. Instant invention modifies the decaying process by manipulating the rate of decay with the use of varying decay stimulation patterns. This obviates the need for the shadow mask and all the attendant alignment problems. Further, absence of the shadow mask allows all of the beam emitted from the electron gun to impinge on the screen with the result of making the screen many times brighter than it could be with a shadow mask in place.

The decay rate is manipulated by LCD projection system 106 which receives the standard video image signal (NTSC) from sources external to CRT 100 and, concurrently with the emission of the excitation energy by electron gun 104, projects the decay stimulation patterns to be incident on screen 102. LCD projection system 106 is comprised of radiation source 114 which is capable of emitting radiation of a frequency (usually, infrared) that is appropriate to stimulate the decay rate of the phosphor dots on which it impinges. Therefore the wavelength of the radiation is chosen to correspond to the chemical composition of the phosphor dots so as to ensure that the decay rate of the dots will be stimulated by that particular frequency. LCD array 108 which actually projects the stimulation patterns based on the entire video image received from externally is positioned between radiation source 114 and screen 102. This, in effect, creates an infrared shadow of the stimulation patterns on the screen so that the decay process of the phosphor dots is tempered and controlled by the patterns. The LCD array does not need to be large but must be compatible with the digital video signals received from externally. High-quality, inexpensive LCD's with a large number of pixels but not large in physical size can be produced with the current technology.

When the decay stimulation patterns emerging from LCD array 108 passes through reimaging lens 116 and impinges on the phosphor screen, each phosphor dot has its response to the electron beam from electron gun 104 independently adjusted by the strength of the modulated decay stimulation radiation. Registration detectors 124, 126, located at corners of the screen as shown monitor the positioning of images on the screen and generate error signals when the images move out of the frame of the screen. These error signals, if any, are transmitted to PZT actuators 110, 112 via common suitable electronic coupling means 130, 132. Then the actuators which are coupled to LCD array 108, in response to these signals, manipulate the spatial orientation of the array so that the image on the screen is moved to be contained entirely within the perimeters of the screen. Of course, more than two detectors can be used to perform this function; for example, four detectors, each located on one of the four corners of the screen.

To define precisely the CRT pixel dot area, the principle of quenching is used. Quenching may be accomplished in two ways: One, an overlay pattern may be laid down on the screen during manufacture of the device that coats or impregnates non-pixel, or quenching, area 204 with a phosphor additive that makes the area sensitive to quenching. Quenching radiation emanates from light source 120 inside flood illuminator 118 and passes through condensing lens 122 to be incident on the entire screen. Under such quenching radiation, non-pixel areas 204 which are numerous and interspersed among phosphor dots 202 throughout the screen become dark, thereby providing sharp edges to the color images resulting on the screen. Another way to achieve the quenching effect is to omit the flood illuminator all together and, instead, make the non-pixel areas sensitive to the same light spectra as the decay stimulation radiation emanating from source 114. In this case, the reimaged pixel areas cover the quenching region around each phosphor dot.

The quenching activation light originating from light source 120 is in the near-IR spectral region just as is the decay stimulation radiation from radiation source 114 and thus is not visible to the viewer. To prevent unwanted light of these spectral regions from entering the CRT from outside, an optical notch spectral filter coating 128 may be applied to the exterior of the screen, as shown.

IR quenching can also be used to advantage in making CRT's that can run at faster than ordinary frame rates. Normally, a CRT video screen runs at 30 frames per second. However, occasionally it is desirable to run it at higher rates, say 60 frames per second or even 120 frames per second. But at these faster frame rates, the standard phosphor decay time causes the previous frame still to be visible on the screen when the new frame image is overwritten on it. By using a modified phosphor which has the optical quenching effect, the screen can be briefly illuminated between frames by the IR light, causing immediate quenching of the current image so that there is no lingering half-decayed image frame present when the next image frame is written on the screen.

For the LCD-CRT hybrid image tube to function properly, it is highly critical that the projected LCD image precisely illuminate each pixel with its correct in-focus control signal. This control problem can be resolved by proper optical design of reimaging lens 116 or by taking advantage of the fact that the screen itself can be manufactured with a curvature that matches the residual focal plane curvature.

The LCD-CRT hybrid image tube offers several advantages over the current technology images tubes. To name a few: Only one electron gun is needed, as opposed to three in a state-of-the-art tube, since all three phosphor dots in a pixel are illuminated to different degrees by the decay stimulation patterns emanating from the LCD array, not by the electron beam. The electron beam does not need to be modulated and can be very large in diameter since it need to hit all three dots at the same time. This means that the focusing of the electron beam is made much less critical as is its registration. Besides, if the same focusing technology as on current designs is retained, then resolutions can be three times higher per line for a total of nine times higher per image with no increase in cost or technological complexity. The cost of image tube production will be substantially reduced by a less critical alignment of the electron gun, fewer needed parts and elimination of the shadow mask and corresponding elimination of the exact alignment requirement, thus making a more rugged design possible. Further, the lack of a shadow mask means a much brighter screen with no reduction in its useful life expectancy.

Although a particular embodiment and form of this invention has been illustrated, it is apparent that various modifications and embodiments of the invention may be made by those skilled in the art without departing from the scope and spirit of the foregoing disclosure. Accordingly, the scope of the invention should be limited only by the claims appended hereto.

We claim:

1. An LCD-CRT hybrid image tube, said tube comprising: a screen comprised of a plurality of pixels, each of said pixels being made of a phosphor dot triplet, a means for exciting said phosphor dots, a first radiation source for emitting decay stimulation spectra toward said screen; an LCD array positioned between said first source and said screen, said array being suitable for receiving video signals from externally and, in response thereto, transmitting decay patterns to said phosphor dots and a re-imaging lens, said re-imaging lens being placed between said array and said screen for re-imaging the decay patterns on said screen, thereby controlling the intensity of the visible light output of said dots.

2. An image tube as set forth in claim 1, wherein said tube further comprises a plurality of registration detectors, at least one of said detectors being located at one corner of said screen, said detectors being capable of monitoring the positions of said patterns on said screen and producing error signals when said patterns move out of the perimeters of said screen.

3. An image tube as set forth in claim 2, wherein said tube still further comprises a plurality of actuators, said actuators being coupled between said detectors and said array to manipulate the spatial orientation of said array in response to error signals received from said detectors.

4. An image tube as set forth in claim 3, wherein said exciting means is an electron gun positioned to illuminate said screen.

5. An image tube as set forth in claim 4, wherein said screen further comprises quenching areas, said areas being interspersed with said pixels in a given pattern to provide edge enhancement to any image resulting on said screen.

6. An image tube as set forth in claim 5, wherein said tube still further comprises a flood illuminator positioned to illuminate said quenching areas, said illuminator being capable of emitting radiation of suitable frequency to cause said areas to become dark upon being illuminated thereby.

7. An image tube as set forth in claim 6, wherein said flood illuminator comprises a second radiation source for emitting the quenching radiation and a condensing lens positioned between said second source and said quenching areas.

8. An image tube as set forth in claim 7, wherein an optical spectral filter coating is applied to the exterior of said screen to prevent entrance into said tube of unwanted radiation of a given frequency.

9. An image tube as set forth in claim 5, wherein said first radiation source emits radiation of proper frequency to darken said quenching areas.

* * * * *